(12) United States Patent
Zhang et al.

(10) Patent No.: US 10,804,810 B2
(45) Date of Patent: Oct. 13, 2020

(54) DC-DC CONVERTER AND A METHOD FOR CONTROLLING A DC-DC CONVERTER

(71) Applicant: Astec International Limited, Kwun Tong, Kowloon (HK)

(72) Inventors: Jinying Zhang, Shen Zhen (CN); Zhishuo Li, Shen Zhen (CN); Huihui Lu, Shen Zhen (CN); Yuandong He, Shen Zhen (CN); Shoutang Cheng, Shen Zhen (CN)

(73) Assignee: Astec International Limited, Kwun Tong (HK)

( * ) Notice: Subject to any disclaimer, the term of this patent is extended or adjusted under 35 U.S.C. 154(b) by 0 days.

(21) Appl. No.: 16/414,482

(22) Filed: May 16, 2019

(65) Prior Publication Data

US 2019/0356233 A1 Nov. 21, 2019

(30) Foreign Application Priority Data

May 18, 2018 (CN) .......................... 2018 1 0482270

(51) Int. Cl.
*H02M 3/335* (2006.01)
*H02M 1/08* (2006.01)

(52) U.S. Cl.
CPC ......... *H02M 3/33592* (2013.01); *H02M 1/08* (2013.01)

(58) Field of Classification Search
CPC ............. H02M 3/335; H02M 3/33507; H02M 3/33515; H02M 3/33592; H02M 7/02; H02M 7/155; H02M 7/21; H02M 7/217
See application file for complete search history.

(56) References Cited

U.S. PATENT DOCUMENTS

| | | | | |
|---|---|---|---|---|
| 5,077,486 A | * | 12/1991 | Marson | .................... C23F 13/04 204/196.03 |
| 6,418,039 B2 | * | 7/2002 | Lentini | ............. H02M 3/33592 363/21.05 |
| 7,054,168 B1 | * | 5/2006 | Fronk | ............... H02M 3/33576 363/127 |
| 8,373,403 B1 | | 2/2013 | Radovic | |

(Continued)

OTHER PUBLICATIONS

John Stevens, "Pre-biased Output Voltage Startup Operation of the UCC28950 Phase-Shifted Full-Bridge Controller", Texas Instruments, Aug. 2011.

(Continued)

*Primary Examiner* — Adolf D Berhane

(57) ABSTRACT

A switch-mode DC-DC power converter includes one or more input terminals for receiving an input voltage from a voltage source, one or more output terminals for supplying an output voltage to a load, and a transformer coupled between the input and output terminals. The transformer includes at least one primary winding and at least one secondary winding. The converter also includes a primary switch coupled to control current through the at least one primary winding, a synchronous rectifier coupled to control current through the at least one secondary winding, and means for controlling switching operation of the synchronous rectifier by disabling switching of the synchronous rectifier for a defined time delay in response to receiving an input signal indicative of a startup of the DC-DC power converter, and enabling switching of the synchronous rectifier after the defined time delay has elapsed.

25 Claims, 11 Drawing Sheets

(56) References Cited

U.S. PATENT DOCUMENTS

| | | | | |
|---|---|---|---|---|
| 8,477,514 | B2* | 7/2013 | Artusi | H02M 1/4225 |
| | | | | 363/21.01 |
| 8,717,783 | B2* | 5/2014 | Wang | H02M 3/33592 |
| | | | | 363/17 |
| 8,908,393 | B2 | 12/2014 | Ye et al. | |
| 9,742,288 | B2* | 8/2017 | Balakrishnan | H02M 3/33507 |
| 9,866,100 | B2 | 1/2018 | Lam et al. | |
| 10,110,137 | B1* | 10/2018 | Moon | H02M 3/33592 |
| 10,224,828 | B1* | 3/2019 | Sigamani | H02M 3/33507 |
| 2010/0182806 | A1* | 7/2010 | Garrity | H02M 3/33569 |
| | | | | 363/21.14 |

OTHER PUBLICATIONS

"UCC28250 Advanced PWM Controller With Prebias Operation", Texas Instruments, Aug. 2015, 57 pages.

\* cited by examiner

DC-DC CONVERTER AND A METHOD FOR CONTROLLING A DC-DC CONVERTER

CROSS-REFERENCE TO RELATED APPLICATIONS

This application claims the benefit and priority of Chinese Patent Application No. 201810482270.9 filed May 18, 2018. The entire disclosure of the above application is incorporated herein by reference.

FIELD

The present disclosure relates to DC-DC converters and methods for controlling DC-DC converters.

BACKGROUND

This section provides background information related to the present disclosure which is not necessarily prior art.

When a plurality of power supply modules are connected in parallel, different modules may be powered-on and powered-off at different times. During power-on or power-off of one of the power supply modules, a pre-bias voltage typically exists at an output of the power supply.

When there is a single voltage load at the output of the power supply and the power supply does not include a pre-bias function, the voltage on the load will decrease when the power supply is powered-on and powered-off, which may damage components of the power supply due to energy recirculation. Existing pre-bias circuits are complicated and have poor reliability.

FIG. 1 illustrates a schematic structural view of a DC-DC converter 100 including a hot-plug circuit according to the prior art. As shown in FIG. 1, the DC-DC converter 100 includes a transformer 102, a switching unit 104 located on a primary side of the transformer 102, and a synchronous rectification unit 106 located on a secondary side of the transformer 102.

Vin+ and Vin− are positive and negative input terminals of the switching unit 104, and Vout+ and Vout− are positive and negative output terminals of the DC-DC converter 100. Np and Ns1 are a primary side winding and a secondary side winding of the transformer 102, and PWM is a driving signal of the synchronous rectification unit 106.

At the output of the DC-DC converter 100 (which does not include a pre-bias function), a hot-plug circuit, i.e., a metal-oxide semiconductor field-effect transistor (MOSFET) Q1, is connected in series to prevent damage to components of the DC-DC converter 100 caused by energy recirculation that occurs when the DC-DC converter 100 starts up and is turned off.

Specifically, when the DC-DC converter 100 is turned on and turned off, delay times of turn-on and turn-off of Q1 are controlled by a control circuit of Q1, i.e., the MOSFET control circuit 108, to prevent an output voltage from other DC-DC converters connected in parallel damaging the components of the DC-DC converter 100 due to recirculation through the output.

However, in the DC-DC converter 100 shown in FIG. 1, addition of the MOSFET Q1 increases costs, increases complexity of the circuitry of the DC-DC converter 100, and reduces efficiency of the DC-DC converter 100 when a large current is supplied to the output.

FIG. 2 is a schematic structural view of parallel DC-DC converters according to the prior art. As shown in FIG. 2, a parallel DC-DC converter system includes two parallel DC-DC converters 200A and 200B.

Each of the DC-DC converters 200A and 200B comprises a transformer 202, a switching unit 204 located on a primary side of the transformer 202, and a synchronous rectification unit 206 located on a secondary side of the transformer 202. As shown in FIG. 2, in each converter Vin+ and Vin− are a positive input terminal and a negative input terminal of the switching unit 204, respectively, and Vout+ and Vout− are positive and negative output terminals.

In each converter 200A and 200B, Np and Ns1 are a primary side winding and a secondary side winding of the transformer 202, VCC is an auxiliary power supply of the secondary side, R1 and R2 are resistors, Vp is a bias voltage of an output end of the DC-DC converter, and Vo is an output voltage of the DC-DC converter.

PWM_in is an input signal of an MOSFET driver 210, PWM_out is an output signal of the MOSFET driver 210 and is a driving signal of the synchronous rectification unit 206, and Enable is an enabling signal for the MOSFET driver 210. When the Enable signal is at a low level the MOSFET driver has no output, and when the Enable signal is at a high level the output signal PWM_out of the MOSFET driver 210 is the same as the input signal PWM_in.

As shown in FIG. 2, in each of the DC-DC converters 200A and 200B, Vp and a capacitor C1 are connected in series with a positive end pin of a comparator 212, and a voltage at the positive end pin of the comparator 212 is capable of reflecting a change in the Vp voltage. A negative end pin of the comparator 212 is connected with a reference voltage REF. The comparator 212 compares the voltage at the positive end pin with the voltage at the negative end pin, i.e., the reference voltage, to control an operating state of the synchronous rectification unit 206 of the secondary side.

When one of the DC-DC converters 200A and 200B starts up, the voltage at the positive end pin of the comparator 212 is less than the voltage at the negative end pin, the Enable signal output is a low level, and the synchronous rectification unit 206 operates in a Schottky diode state.

When the output voltage Vo of the DC-DC converter 200A or 200B is lower than Vp, the voltage Vp remains unchanged, and the Enable signal maintains a logical low level. When the output voltage Vo of the DC-DC converter 200A or 200B is higher than Vp, the voltage Vp starts to rise so the voltage at the positive end pin of the comparator 212 is greater than the voltage at the negative end pin, and the Enable signal transitions from a logical low level to a logical high level so the synchronous rectification unit 206 is switched from the Schottky diode state to a synchronous rectification state.

The DC-DC converters 200A and 200B shown in FIG. 2 may be used in an open-loop system, in spite of a deficiency that when a plurality of DC-DC converters are connected in parallel, time points of power-on and power-off of each of the DC-DC converters are inconsistent where a value of Vp will be interfered with by outputs of other DC-DC converters.

Specifically, even if the output voltage Vo of one DC-DC converters 200A and 200B remains lower than Vp, the value of Vp may rise under the influence of outputs of other DC-DC converters, and the Enable signal transitions from a logical low level to a logical high level so the synchronous rectification unit 206 is switched to a synchronous rectification operating state, resulting in damage to modules due to energy recirculation.

FIG. 3 is a schematic structural view of host and slave power supplies 300A and 300B, according to the prior art. In a parallel power supply system, it is possible to first allocate a power supply as a host, which is connected directly to a current sharing bus, and remaining power supplies are slaves and acquire a current signal from the current sharing bus.

In FIG. 3, the power supply 300A is a host that operates in a voltage-controlled mode, the power supply 300B is a slave, $V_{in}$ is an input voltage, $V_O$ is an output voltage, $n_p$ and $n_s$ are a primary side winding and a secondary side winding, respectively, $I_{BUS}$ is a signal from the current sharing bus, $I_O$ represents an output current, and R1 and R2 are resistors.

As shown in FIG. 3, the output current signal from the slave power supply 300B is compared with the signal from the current sharing bus $I_{BUS}$ by an error amplifier 312, and then is compensated by a reference voltage Ref. The object of current sharing is ultimately achieved by adjusting the output voltage $V_O$.

The host and slave power supplies 300A and 300B as shown in FIG. 3 provide an advantage of realizing accurate current sharing, but have disadvantages in that if the host fails the whole system will completely break down, and a wide frequency voltage-controlled loop is easily interfered by noise. Therefore, connection between the host and the slave power supplies 300A and 300B should be short as possible, and the host and slave power supplies 300A and 300B cannot be realized in open-loop converters.

SUMMARY

This section provides a general summary of the disclosure, and is not a comprehensive disclosure of its full scope or all of its features.

According to one aspect of the present disclosure, a switch-mode DC-DC power converter includes one or more input terminals for receiving an input voltage from a voltage source, one or more output terminals for supplying an output voltage to a load, and a transformer coupled between the input and output terminals. The transformer includes at least one primary winding and at least one secondary winding. The converter also includes a primary switch coupled to control current through the at least one primary winding, a synchronous rectifier coupled to control current through the at least one secondary winding, and means for controlling switching operation of the synchronous rectifier by disabling switching of the synchronous rectifier for a defined time delay in response to receiving an input signal indicative of a startup of the DC-DC power converter, and enabling switching of the synchronous rectifier after the defined time delay has elapsed.

According to another aspect of the present disclosure, a method of controlling a switch-mode DC-DC power converter is disclosed. The converter includes a transformer including at least one primary winding and at least one secondary winding, and a synchronous rectifier coupled to control current through the at least one secondary winding. The method includes disabling switching of the synchronous rectifier for a defined time delay in response to receiving an input signal indicative of a startup of the DC-DC power converter, and enabling switching of the synchronous rectifier after the defined time delay has elapsed.

According to yet another aspect of the present disclosure, a switch-mode DC-DC power converter includes one or more input terminals for receiving an input voltage from a voltage source, one or more output terminals for supplying an output voltage to a load, and a transformer coupled between the input and output terminals, the transformer including at least one primary winding and at least one secondary winding. The converter also includes a primary switch coupled to control current through the at least one primary winding, a synchronous rectifier coupled to control current through the at least one secondary winding, and a control circuit coupled to receive an input signal indicative of active operation of the DC-DC converter from one of the windings of the transformer or an isolator coupled between primary and secondary sides of the transformer and control switching operation of the synchronous rectifier, by enabling switching operation of the synchronous rectifier for a defined time delay in response to the input signal transitioning to a logical low level and disabling switching operating of the synchronous rectifier after the defined time delay has elapsed.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 7 is a diagram illustrating waveforms of the DC-DC power converter of FIG. 6 during turn-on.

DETAILED DESCRIPTION

Figure 1:
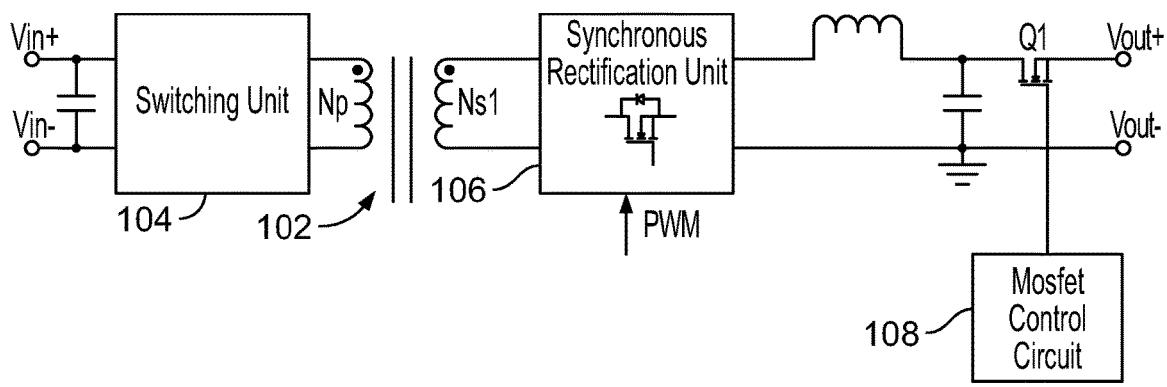
FIG. 1 is a circuit diagram of a DC-DC converter including a hot-plug circuit, according to the prior art.
Figure 2:
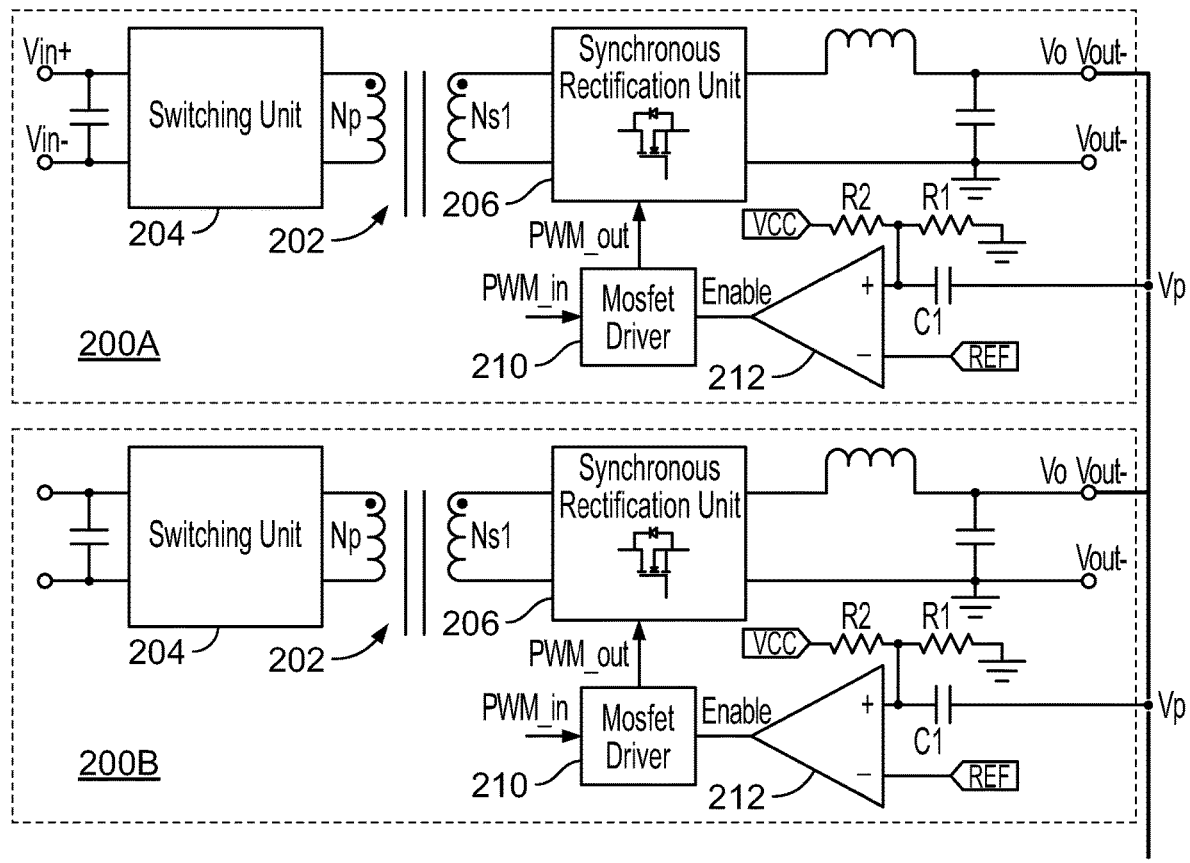
FIG. 2 is a circuit diagram of parallel DC-DC converters according to the prior art.
Figure 3:
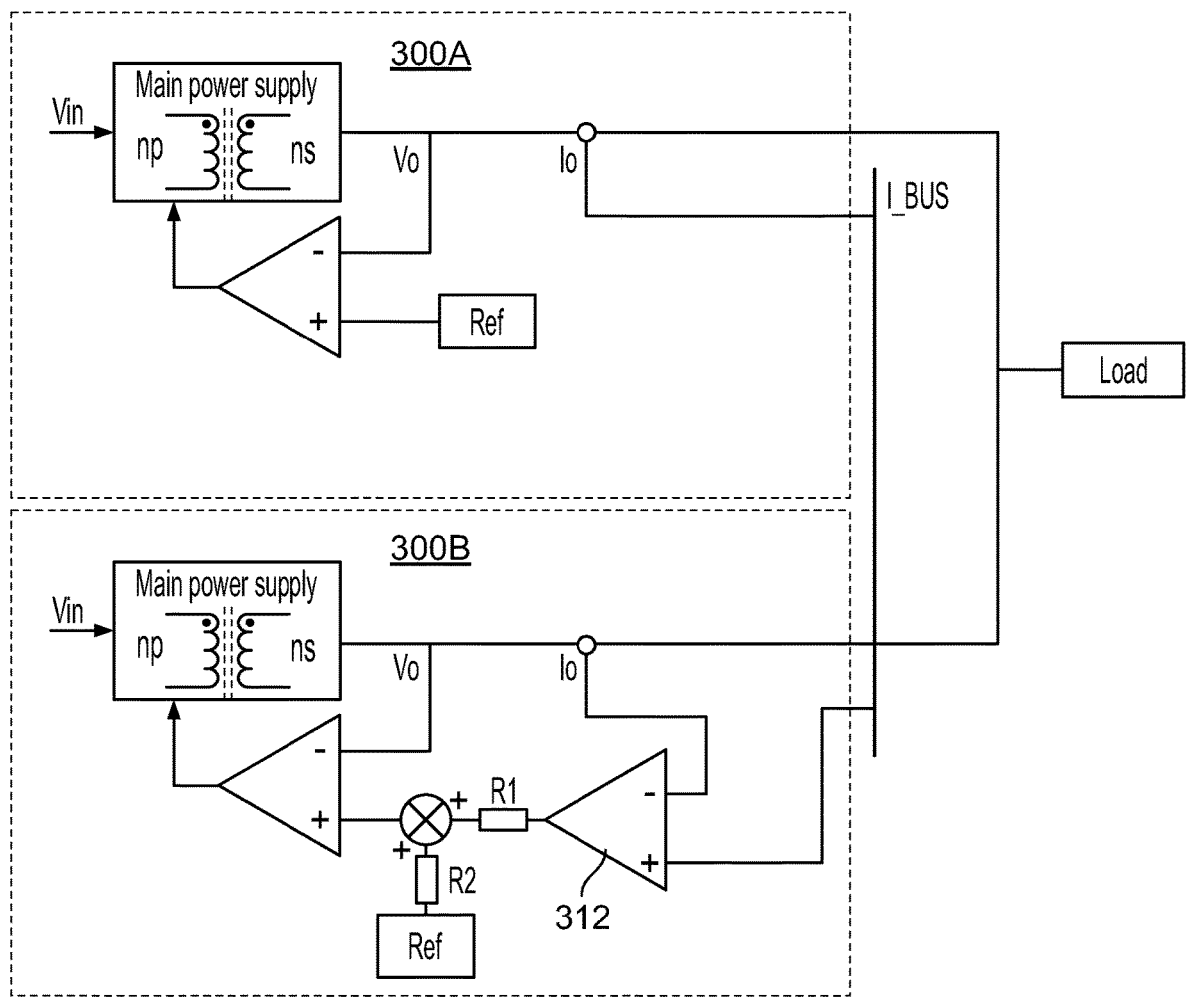
FIG. 3 is a circuit diagram of host and slave DC-DC converters according to the prior art.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Example embodiments will now be described more fully with reference to the accompanying drawings.

Figure 4:
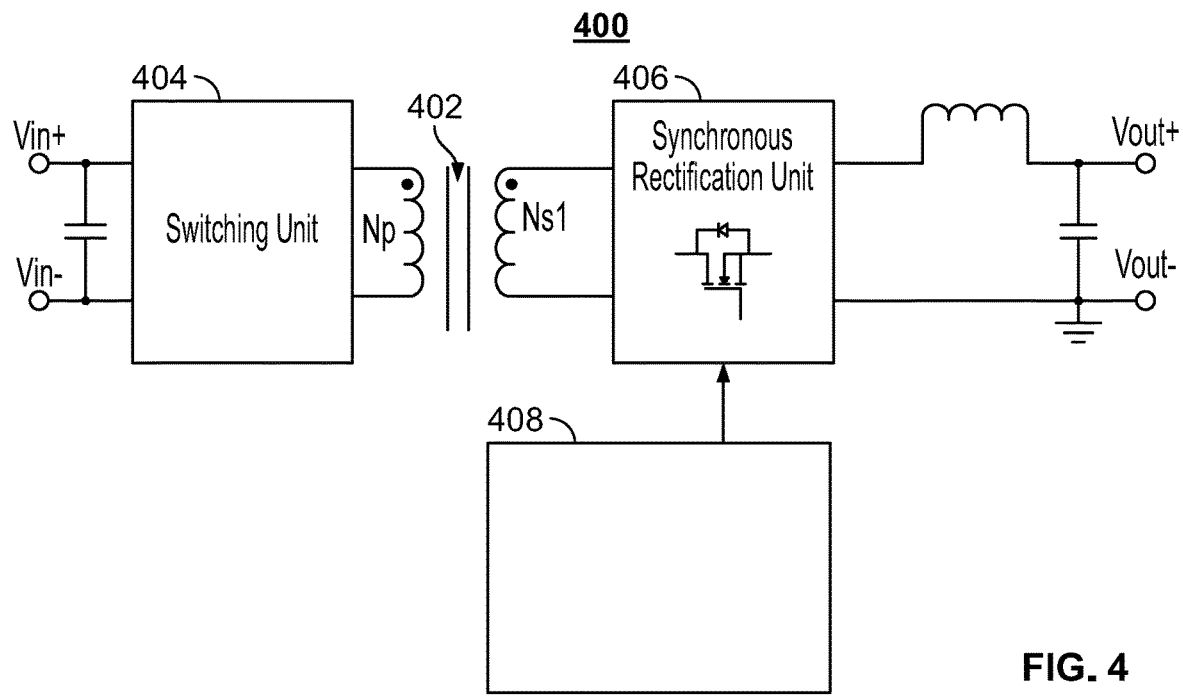
FIG. 4 is a circuit diagram of a DC-DC power converter, according to an example embodiment of the present disclosure.

A switch-mode DC-DC power converter according to one example embodiment of the present disclosure is illustrated in FIG. 4, and indicated generally by reference 400. The power converter 400 includes input terminals Vin+ and Vin− for receiving an input voltage from a voltage source, output terminals Vout+ and Vout− for supplying an output voltage to a load, and a transformer 402 coupled between the input and output terminals.

The transformer 402 includes at least one primary winding Np and at least one secondary winding Ns1. The converter also includes a primary switch 404 coupled to control current through the at least one primary winding Np, and a synchronous rectifier 406 coupled to control current through the at least one secondary winding Ns1.

The power converter 400 also includes means (e.g., a control circuit 408) for controlling switching operation of the synchronous rectifier by disabling switching of the synchronous rectifier 406 for a defined time delay in response to receiving an input signal indicative of a startup of the DC-DC power converter 400, and enabling switching of the synchronous rectifier 406 after the defined time delay has elapsed.

The control circuit 408 may be coupled to enable switching operation of the synchronous rectifier 406 for a defined turn-off time delay in response to the input signal transitioning to a logical low level, and to disable switching operation of the synchronous rectifier 406 after the defined turn-off time delay has elapsed. Disabling switching operation of the synchronous rectifier 406 after the defined turn-off time has elapsed may inhibit reverse current into the converter from the output after the converter is turned off, may prevent damage to components of the converter, etc. For example, the specified turn-off time may be shorter than a time period during which VCC remains high after converter turn-off (e.g., due to a large VCC capacitance, etc.), and disabling switching operation of the synchronous rectifier 406 sooner may inhibit reverse current and damage to the converter at turn-off.

The input signal may be received from any source, including a secondary winding of the transformer 402, an auxiliary winding of the transformer 402, via an isolator coupled between primary and secondary sides of the transformer 402, etc.

As explained further below, the control circuit 408 may include a driver circuit coupled to receive a pulse width modulated (PWM) control signal to control switching operation of the synchronous rectifier 406 according to the received PWM control signal.

The control circuit 408 may also include a pre-bias circuit coupled to receive the input signal and selectively enable and disable the driver circuit according to the received input signal and the defined time delay. For example, and as described further below, the pre-bias circuit may include at least one resistor and at least one capacitor coupled in one or more resistor-capacitor (RC) circuits, and the defined time turn-on delay and/or defined turn-off delay may correspond to RC time constant(s) of the RC circuit(s). The defined time delay(s) may be predetermined (e.g., set by a machine or technician during manufacture or setup of the power converter), may be adjusted during operation using adjustable components, etc.

Figure 5:
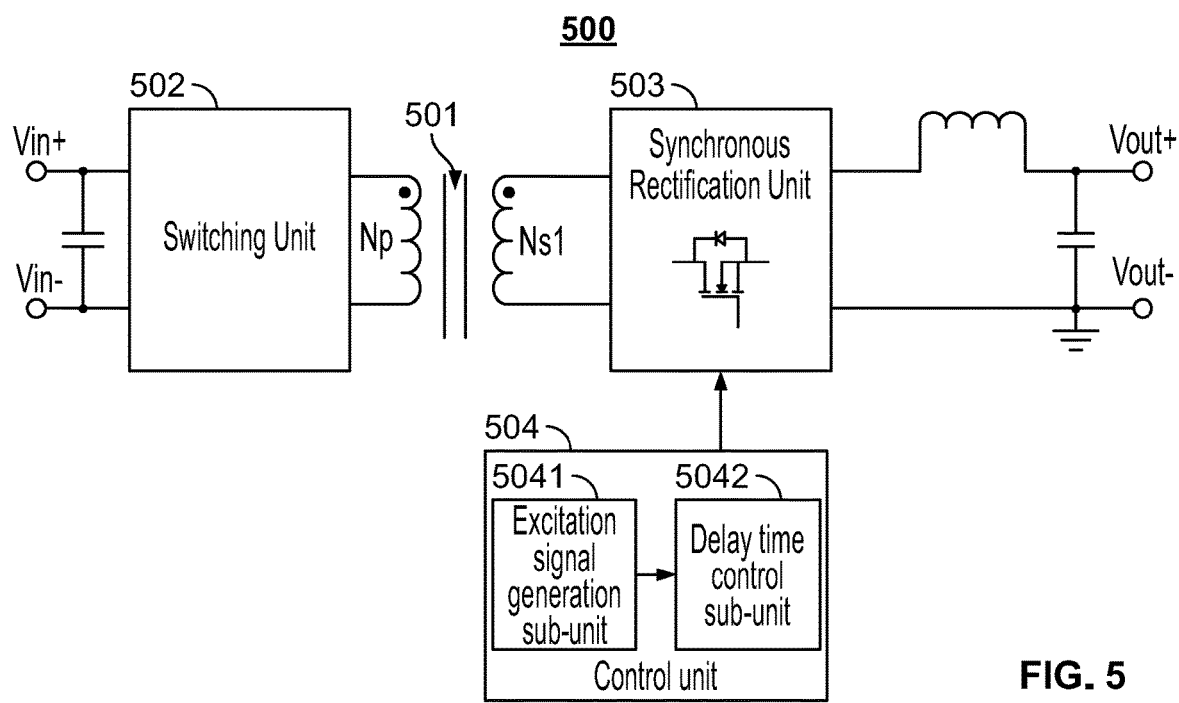
FIG. 5 is a circuit diagram of a DC-DC power converter including an excitation signal generation sub-unit and a delay time control sub-unit, according to another example embodiment of the present disclosure.

FIG. 5 is a schematic block diagram illustrating a DC-DC converter 500 according to another example embodiment of the present disclosure. As shown in FIG. 5, a DC-DC converter 500 includes a transformer 501, a switching unit 502 located on a primary side of the transformer 501, a synchronous rectification unit 503 located on a secondary side of the transformer 501, and a control unit 504 coupled to control timings at which the synchronous rectification unit 503 is switched on and switched off.

The control unit 504 may include an excitation signal generation sub-unit 5041 coupled to generate, when the DC-DC converter 500 is turned on, an excitation signal associated with a startup signal of the primary side. The control unit 504 may also include a delay time control sub-unit 5042 coupled to, using the excitation signal, switch on the synchronous rectification unit with a defined time delay relative to a timing at which the DC-DC converter 500 is turned on.

In FIG. 5, Vin+ and Vin− are positive input terminals and negative input terminals of the switching unit 502, Vout+ and Vout− are positive and negative output terminals of the DC-DC converter 500, and Np and Ns1 are a primary side winding and a secondary side winding of the transformer 501. The synchronous rectification unit 503 may include a MOSFET.

When the DC-DC converter 500 is turned on, the excitation signal generation sub-unit 5041 generates an excitation signal associated with a startup signal of the primary side. The delay time control sub-unit 5042 of the control unit 504, by using the excitation signal, switches on the synchronous rectification unit 503 with a defined time delay relative to a timing at which the DC-DC converter 500 is turned on.

Specifically, the control unit 504 may control, according to the excitation signal associated with the startup signal of the primary side generated when the DC-DC converter 500 is turned on, the synchronous rectification unit 503 to switch on with the defined time delay relative to the timing at which the DC-DC converter 500 is turned on, thereby preventing damage to components of the DC-DC converter 500 which are caused by energy recirculation that otherwise occurs when the DC-DC converter 500 is turned on.

The delay time control sub-unit 5042 may be coupled to, in response to disappearance of the excitation signal, switch off the synchronous rectification unit 503 with a defined turn-off time delay relative to a timing at which the DC-DC converter 500 is turned off.

As an example, when the DC-DC converter 500 is turned off, the startup signal of the primary side disappears and the above excitation signal also disappears correspondingly. The delay time control sub-unit 5042 may switch off the synchronous rectification unit 503 with a defined turn-off time delay relative to a timing at which the DC-DC converter 500 is turned off, thereby preventing damage to components of the DC-DC converter 500 which are caused by energy recirculation that otherwise occurs when the DC-DC converter 500 is turned off.

Figure 6:
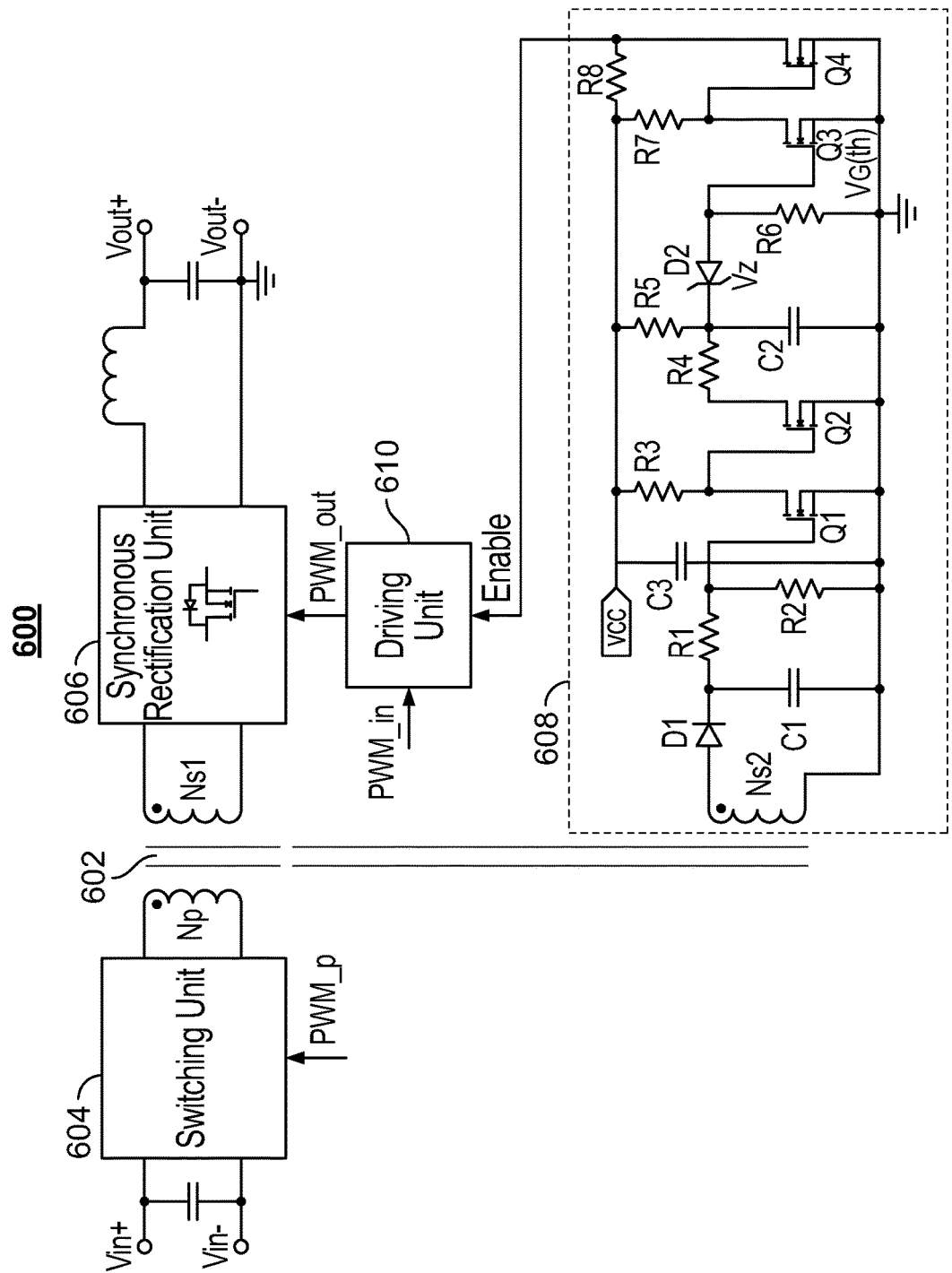
FIG. 6 is a circuit diagram of a DC-DC power converter including a pre-bias circuit and a driver circuit, according to yet another example embodiment of the present disclosure.

FIG. 6 is a schematic circuit diagram illustrating a DC-DC converter 600 according to another example embodiment of the present disclosure. As shown in FIG. 6, the DC-DC converter 600 includes a transformer 602, a primary switching unit 604 (e.g., at least one primary switch), and a secondary rectification unit 606 (e.g., at least one synchronous rectifier). The secondary side of the transformer 602 includes a first secondary winding Ns1 and a second secondary winding Ns2. The first secondary winding Ns1 is connected to the synchronous rectifier 606.

The pre-bias circuit 608 includes the second secondary winding Ns2, and a first diode D1 and a capacitor C1 connected in series. A positive polarity end of the second secondary winding Ns2 is connected with an anode of the first diode D1, a negative polarity end of the second secondary winding Ns2 is connected with one end of the capacitor C1, and a cathode of the first diode D1 is connected with the other end of the capacitor C1. The pre-bias circuit 608 is coupled to generate, when the DC-DC converter 600 is turned on, the input signal via coupling with the second secondary winding Ns2.

As shown in FIG. 6, when the DC-DC converter 600 is turned on, the input signal associated with the startup signal of the primary side is generated via the second secondary winding Ns2, with the input signal switching on the first diode D1. When the DC-DC converter 600 is turned off, the startup signal of the primary side disappears, and the input signal also disappears quickly.

As shown in FIG. 6, PWM_p signal is a driving signal of the MOSFET synchronous rectifier 606. As an example, the startup signal of the primary side may be a PWM_p signal. Alternatively, or in addition, the startup signal of the primary side may include a signal on the primary side winding Np of the transformer 602, a power-on signal of the DC-DC converter 600, etc.

The DC-DC converter 600 further includes a driving unit 610 (e.g., a driver circuit), coupled to drive the synchronous rectifier 606 to selectively switch on and switch off the synchronous rectifier 606. The pre-bias circuit 608 may control, via the driver circuit 610, the timings at which the synchronous rectifier 606 is switched on and switched off.

As shown in FIG. 6, PWM_in is an input signal of the driver circuit 610, and PWM_out is an output signal of the driver circuit 610 and a driving signal of the synchronous rectifier 606. Specifically, the driving circuit 610 may drive the synchronous rectifier 606 by PWM_out, to switch on and switch off the synchronous rectifier 606.

Enable is an enable signal of the driver circuit 610, and is supplied by the pre-bias circuit 608. During a period of time where the synchronous rectifier 606 is controlled by the pre-bias circuit 608 to be switched off, the Enable signal is at a logical low level so the driver circuit 610 does not output the PWM_out signal.

During a period of time where the synchronous rectifier 606 is controlled by the pre-bias circuit 608 to be on, the Enable signal is at a high level so the output signal PWM_out of the driver circuit 610 is the same as the input signal PWM_in. As an example, PWM_in may be a signal that is synchronized in phase with PWM_p. The excitation signal (e.g., input signal) may include the PWM_in signal.

The power converter 600 includes optional input and output capacitors coupled between the input and output terminals, respectively, and an inductor coupled between the synchronous rectifier 606 and the output terminals. Other embodiments may include more or less (or none) input capacitors, output capacitors and inductors, may include capacitors and inductors arranged in other circuit configurations, etc. As shown in FIG. 6, the pre-bias circuit 608 also includes a resistor R1, a resistor R2, a resistor R3, a resistor R7 and a resistor R8.

The input terminals Vi+, Vi− and the output terminals Vo+, Vo− may include any suitable connector, terminal, wire, conductive trace, etc. for receiving a power from a voltage source or supplying power to a load. For example, the input terminals may be connected to receive an input voltage from a DC voltage source, from a pre-regulator output, etc.

It should be noted that the DC-DC converter 600 may control timings at which the synchronous rectifier 606 is switched on and switched off directly without using the pre-bias circuit 608 or the driver circuit 610, via separate control signals to the synchronous rectifier 606, etc.

As shown in FIG. 6, the pre-bias circuit 608 includes an auxiliary power supply VCC, a voltage stabilizing diode D2 (e.g., a Zener diode), a capacitor C2 and a MOSFET Q3. The voltage stabilizing diode D2 is connected in parallel with the capacitor C2, a gate of the MOSFET Q3 is connected to the voltage stabilizing diode D2, a drain of the MOSFET Q3 is connected to an output of the pre-bias circuit 608, and a source of the MOSFET Q3 is connected to a ground potential.

The pre-bias circuit may be coupled to cause, under excitation by the input signal, the auxiliary power supply VCC to charge the capacitor C2 so after the defined time delay has elapsed in response to generation of the input signal, a charge voltage of the capacitor C2 is equal to the sum of a stabilized voltage value of the voltage stabilizing diode D2 and a threshold voltage of the MOSFET Q3.

When the DC-DC converter 600 is turned on, the winding Ns2 obtains the startup signal of the primary side as the input signal, and the DC-DC converter 600 starts to generate the auxiliary power supply VCC. The input signal switches on the first diode D1, and thereby causes the gate of the MOSFET Q1 to be at a logical high level so the MOSFET Q1 is switched on. This further causes a gate of a MOSFET transistor Q2 to be at a logical low level so the MOSFET Q2 is switched off.

VCC charges the capacitor C2 through a resistor R5, and a cathode voltage D2_cathode (i.e., a charge voltage of the capacitor C2) of D2 slowly rises from 0 to reach $V_{m1}$ (e.g., $V_{m1}$ is the sum of a stabilized voltage value of the voltage stabilizing diode D2 and a threshold voltage of the MOSFET Q3) at a time point ($t=t_1$) after elapse of a defined time delay $t_1$ from the generation ($t=0$) of the input signal. Specifically, the threshold voltage of the MOSFET Q3 is reached at $t=t_1$ to switch on the MOSFET Q3, the MOSFET Q4 is switched off, and the Enable signal becomes a logical high logical level after maintaining a logical low level for the defined time delay $t_1$.

When VCC charges the capacitor C2 through the resistor R5, the cathode voltage D2_cathode of D2 is as shown by Equation (1).

$$D2\_cathode = \left[V_z + \frac{(V_{cc} - V_z) \times R_5}{R_5 + R_6}\right] \times \left(1 - e^{-\frac{t1}{R_4 \times C_2}}\right) \quad (1)$$

In Equation (1), $V_{CC}$ represents a voltage value of the auxiliary power supply VCC, $R_5$ and $R_6$ represent resistance values of resistors R5 and R6, respectively, $C_2$ represents a capacitance value of the capacitor C2, $V_Z$ represents a stabilized voltage value of the voltage stabilizing diode D2, and $V_{G(th)}$ represents a threshold voltage of the MOS field effect transistor Q3.

The equation of $V_{m1}$ is as shown by Equation (2).

$$V_{m1} = V_Z + V_{G(th)} \quad (2)$$

By substituting D2_cathode in Equation (1) with $V_{m1}$ in Equation (2), it is possible to calculate the defined time delay $t_1$.

In some embodiments, after the defined time delay, the output voltage of the DC-DC converter 600 is higher than a pre-bias voltage, where the pre-bias voltage is set between Vout+ and Vout− in FIG. 6.

As an example, before $t=t_1$, Enable is at a logical low level, PWM_out has no output, and the synchronous rectifier 606 operates in a Schottky diode state as the output voltage of the DC-DC converter 600 rises. After $t=t_1$, the output voltage is higher than the pre-bias voltage, Enable is at a logical high level, and the output signal PWM_out is the same as PWM_in to switch on the synchronous rectifier 606 to a synchronous rectification operating state.

Figure 7:
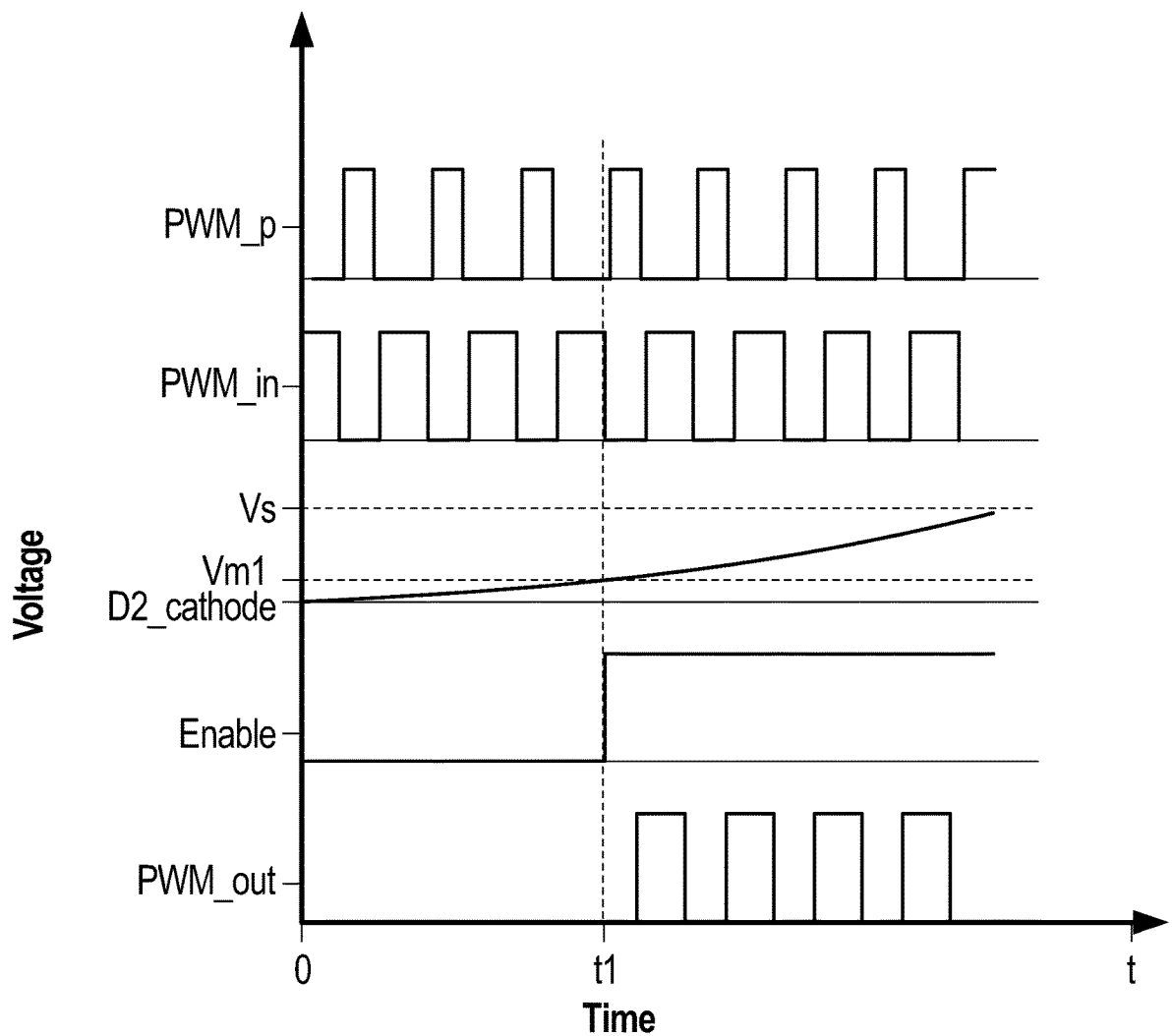

FIG. 7 is a timing sequence diagram 701 illustrating various signal waveforms when the DC-DC converter 600 is turned on. As shown in FIG. 7, at time $t=0$ the DC-DC converter 600 is turned on, and the driving signal PWM_p of the MOSFET 604 is generated. The input signal PWM_in of the driver circuit 610 is in phase synchronization with PWM_p.

Starting from $t=0$, the cathode voltage D2_cathode of D2 slowly rises from 0 to $V_{m1}$ at $t=t_1$. Before $t=t_1$, Enable is at a logical low level, and PWM_out has no output. After $t=t_1$, the output voltage of the DC-DC converter 600 is higher than the pre-bias voltage, Enable is at a logical high level, and PWM_out has an output that is the same as PWM_in. In addition, after $t=t_1$ the cathode voltage D2_cathode of D2 may continue to rise until it is close to the voltage $V_s$ as shown in FIG. 7, wherein the equation of $V_s$ is as shown by Equation (3).

$$V_s = V_z + \frac{(V_{cc} - V_z) \times R_5}{R_5 + R_6}$$

As can be seen from the above descriptions, the design of the pre-bias circuit 608 in the DC-DC converter 600 is simple and readily realized, the electronic elements used in this control unit may only include resistors, capacitors, MOSFETs and the like, and therefore the cost of the pre-bias circuit 608 is reduced. Moreover, the pre-bias circuit 608 may not use power elements, and therefore may have very low power consumption. Furthermore, the DC-DC converter 600 may realize parallel startup of a plurality of open-loop DC-DC converters through the pre-bias circuit 608 allowing use of parasitic body diodes in the MOSFET(s) of the synchronous rectifier 606, and the converter 600 has a pre-bias startup function.

The pre-bias circuit 608 may be coupled to cause, when the input signal disappears, the first capacitor C2 to discharge. After a defined turn-off time delay has elapsed in response to the disappearance of the input signal, a discharge voltage of the first capacitor C2 is equal to the sum of a stabilized voltage value of the voltage stabilizing diode D2 and a threshold voltage of the MOSFET Q3.

As an example, when the DC-DC converter 600 is turned off, the startup signal of the primary side disappears, and the input signal on the winding Ns2 also disappears quickly. VCC will still maintain a logical high level for a period of time due to the effect of the capacitor C3. Because the excitation signal on the winding Ns2 disappears, the gate of the MOSFET Q1 becomes a logical low level and the MOSFET Q1 is switched off to cause the MOSFET Q2 to be switched on. The capacitor C2 discharges through the resistor R4.

Starting from a time when the input signal disappears, the cathode voltage D2_cathode of D2 quickly drops from Vs. When $t=t_2$ and the cathode voltage D2_cathode of D2 reaches $V_{m2}$ (e.g., $V_{m2}$ is the sum of a stabilized voltage value of the voltage stabilizing diode D2 and a threshold voltage of the MOS field effect transistor Q3), the gate voltage of MOSFET Q3 is lower than the threshold voltage thereof, so the MOSFET Q3 is switched off. This switches on the MOSFET Q4, Enable is quickly lowered to a logical low level, and the synchronous rectifier 606 is switched off to operate in a Schottky diode state.

When the capacitor C2 discharges through the resistor R4, the cathode voltage D2_cathode of D2 is as shown by Equation (4).

$$D2\_cathode = V_s \times e^{-\frac{t2}{R_4 \times C_2}} \quad (4)$$

The equation of $V_{m2}$ is as shown by Equation (5).

$$V_{m2} = V_Z + V_{G(th)} \quad (5)$$

By substituting D2_cathode in Equation (4) with $V_{m2}$ in Equation (5), it is possible to calculate the defined turn-off delay time $t_2$.

Figure 8:
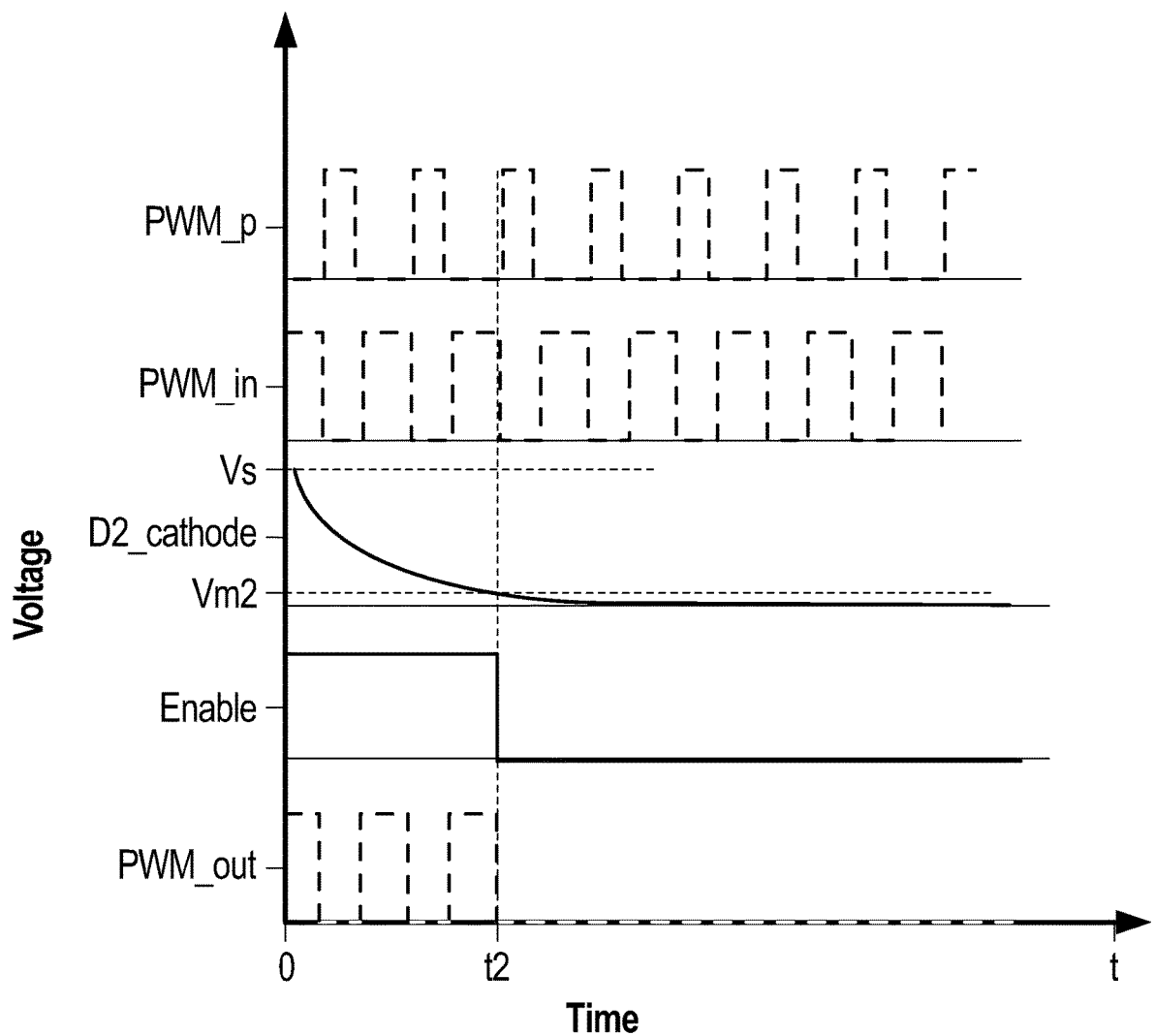
FIG. 8 is a diagram illustrating waveforms of the DC-DC power converter of FIG. 6 during turn-off.

FIG. 8 is a timing sequence diagram 801 illustrating a signal waveform when the DC-DC converter 600 is turned off. As shown in FIG. 8, the DC-DC converter 600 receives a power-off signal at time t=0, the driving signal PWM_p of the primary switch 604 disappears (or optionally lasts for a period of time), and the input signal PWM_in of the driver circuit 610 also disappears quickly (or optionally lasts for a period of time).

As shown in FIG. 8, starting from the disappearance of the input signal, the cathode voltage D2_cathode of D2 starts to drop from $V_s$. Before t=$t_2$, Enable is at a logical high level, and PWM_out has an output that is the same as PWM_in. After t=$t_2$ (e.g., after the cathode voltage D2_cathode of D2 becomes $V_{m2}$), Enable becomes a logical low level, and PWM_out has no output.

As can be seen from the above descriptions, in the DC-DC converter 600 it is possible to adjust delay times of switch-on and switch-off of the synchronous rectifier 606 independently of one another, to reduce space occupied by the DC-DC converter 600 and to improve efficiency of the DC-DC converter 600.

Figure 9:
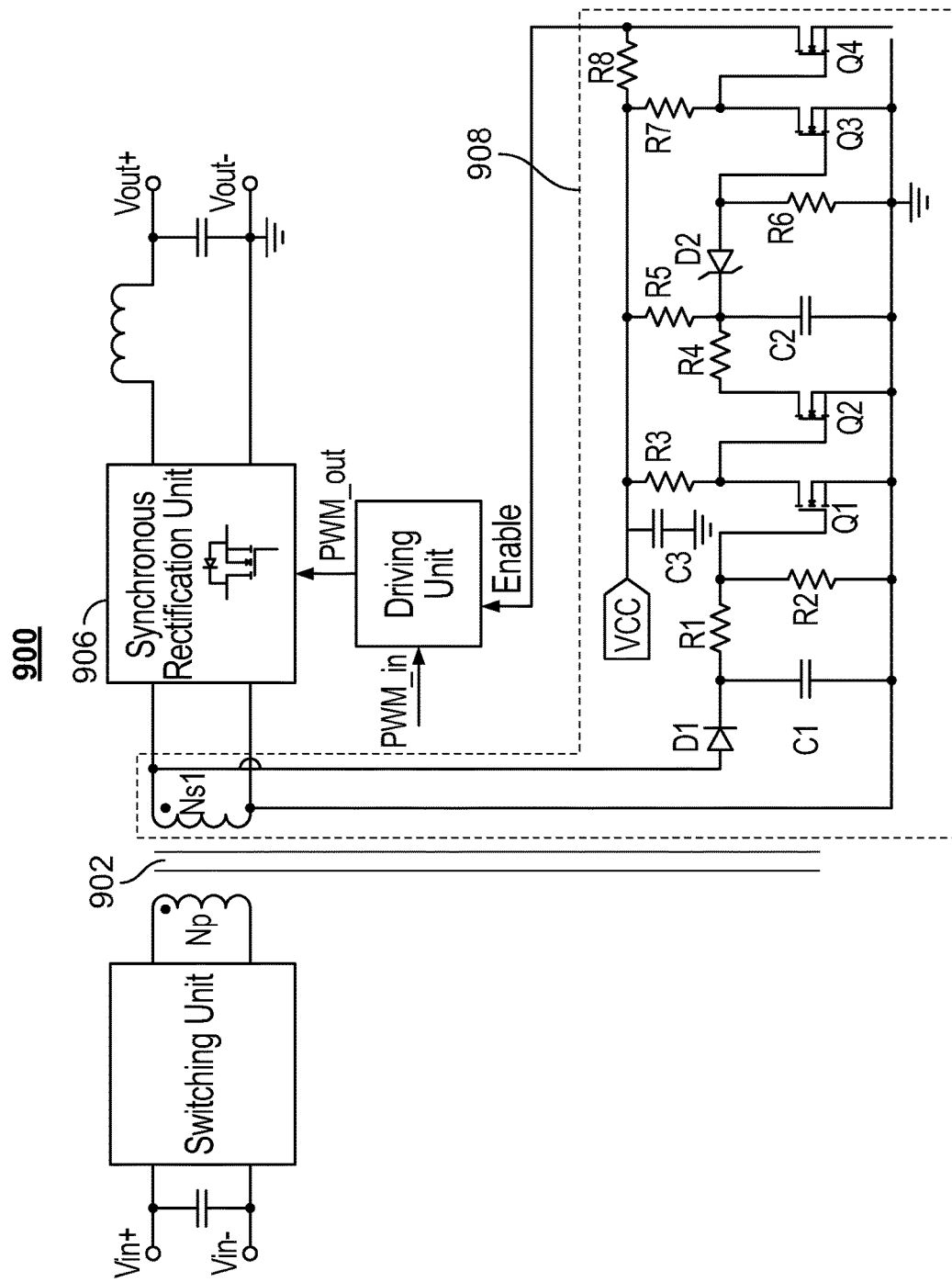
FIG. 9 is a circuit diagram of a DC-DC power converter where a pre-bias circuit includes a secondary winding of the transformer, according to an example embodiment of the present disclosure.

Although FIG. 6 illustrates one circuit arrangement of the DC-DC converter 600 and the pre-bias circuit 608, other embodiments may include other suitable circuit arrangements. For example, FIG. 9 illustrates an example embodiment of a DC-DC converter 900 having a different pre-bias circuit 908.

In the DC-DC converter 900, the secondary side of the transformer 902 has a first winding Ns1 connected to the synchronous rectifier 906. The pre-bias circuit 908 includes the first winding Ns1, a first diode D1 and a capacitor C1 connected in series. A positive polarity end of the first winding Ns1 is connected with an anode of the first diode D1, a negative polarity end of the first winding Ns1 is connected with one end of the capacitor C1, a cathode of the first diode D1 is connected with the other end of the capacitor C1, and the pre-bias circuit 908 is coupled to generate, when the DC-DC converter 900 is turned on, the input signal via the first winding Ns1.

Figure 10:
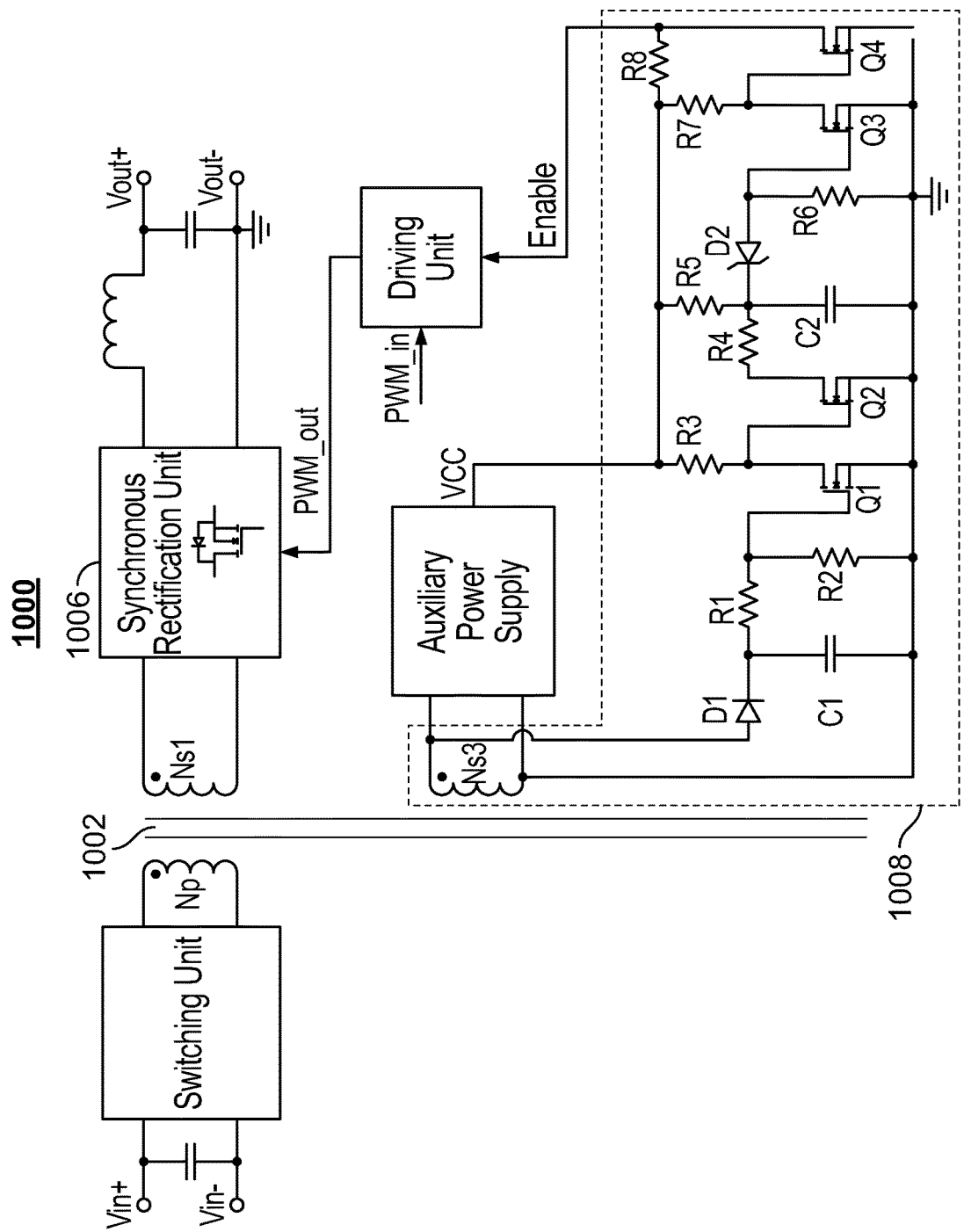
FIG. 10 is a circuit diagram of a DC-DC power converter where a pre-bias circuit includes an auxiliary winding of the transformer, according to another example embodiment of the present disclosure.

FIG. 10 is a schematic circuit diagram illustrating a DC-DC converter 1000 according to another embodiment of the present disclosure. In the DC-DC converter 1000, the secondary side of the transformer 1002 has a first winding Ns1 and a second winding Ns3, with the first winding Ns1 connected to the rectifier 1006. The pre-bias circuit 1008 includes the second winding Ns3, a first diode D1 and a capacitor C1.

A positive polarity end of the second winding Ns3 is connected to an anode of the first diode D1 and also to a positive pole of the auxiliary power supply VCC of the secondary side. A negative polarity end of the second winding Ns3 is connected to one end of the capacitor C1 and also to a negative pole of the auxiliary power supply VCC. A cathode of the first diode D1 is connected with the other end of the capacitor C1, and the pre-bias circuit 1008 is coupled to generate, when the DC-DC converter 1000 is turned on, the input signal via the second winding Ns3.

Figure 11:
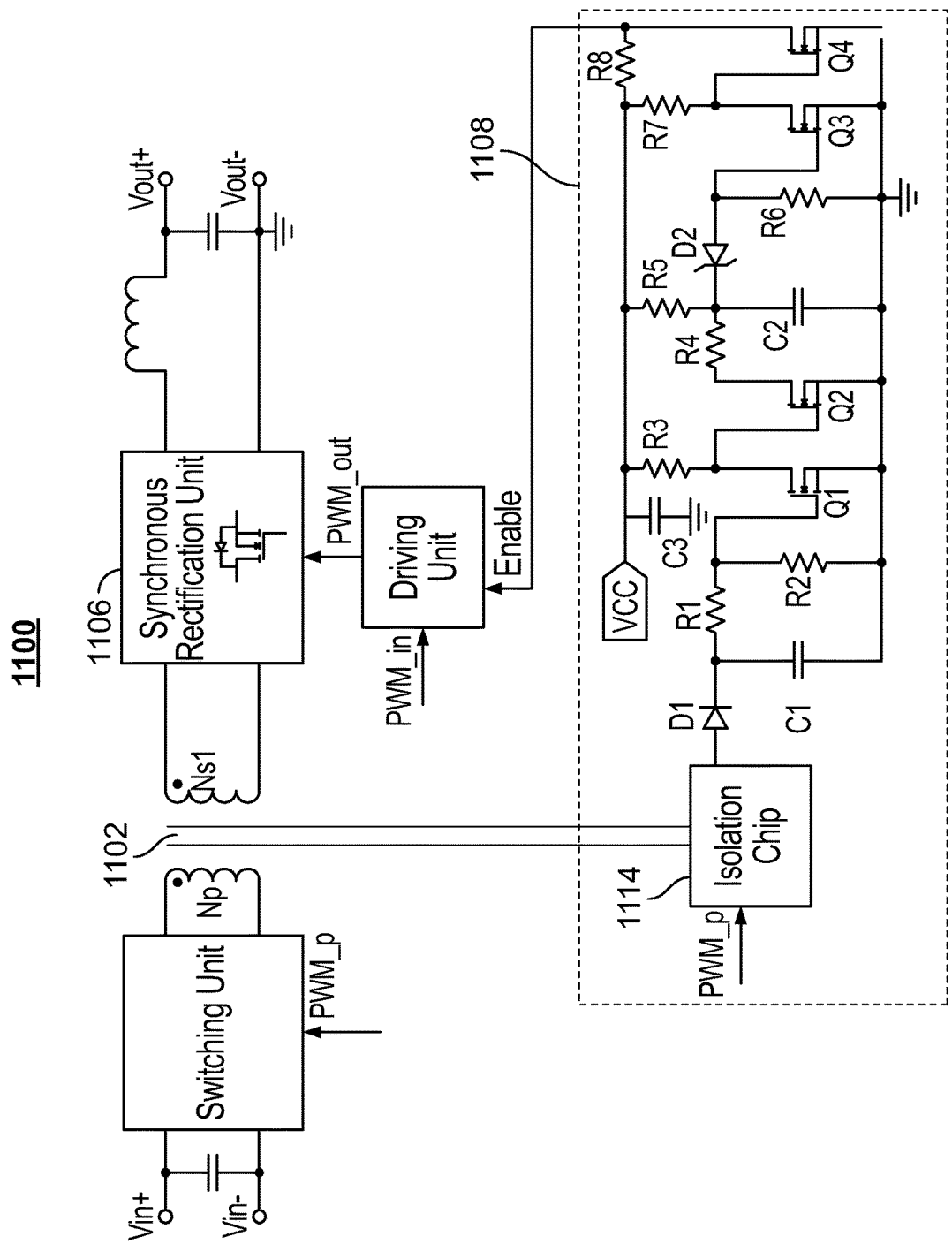
FIG. 11 is a circuit diagram of a DC-DC power converter where a pre-bias circuit includes an isolator, according to yet another example embodiment of the present disclosure.

FIG. 11 is a schematic circuit diagram illustrating a DC-DC converter 1100 according to a further example embodiment of the present disclosure. The DC-DC converter 1100 includes an isolation chip 1114 (e.g., an isolator), which may be part of or separate from the transformer 1102.

The pre-bias circuit 1108 includes the isolator 1114, a first diode D1 and a capacitor C1. The isolator 1114 is connected with an anode of the first diode D1, and a cathode of the diode D1 is connected with one end of the capacitor C1. A driving signal PWM_p of the primary switch 1104 may be supplied by the isolator 1114 from the primary side to the secondary side as the input signal. The pre-bias circuit 1108 may be coupled to generate, when the DC-DC converter 1100 is turned on, the input signal via the isolator 1114.

Figure 12:
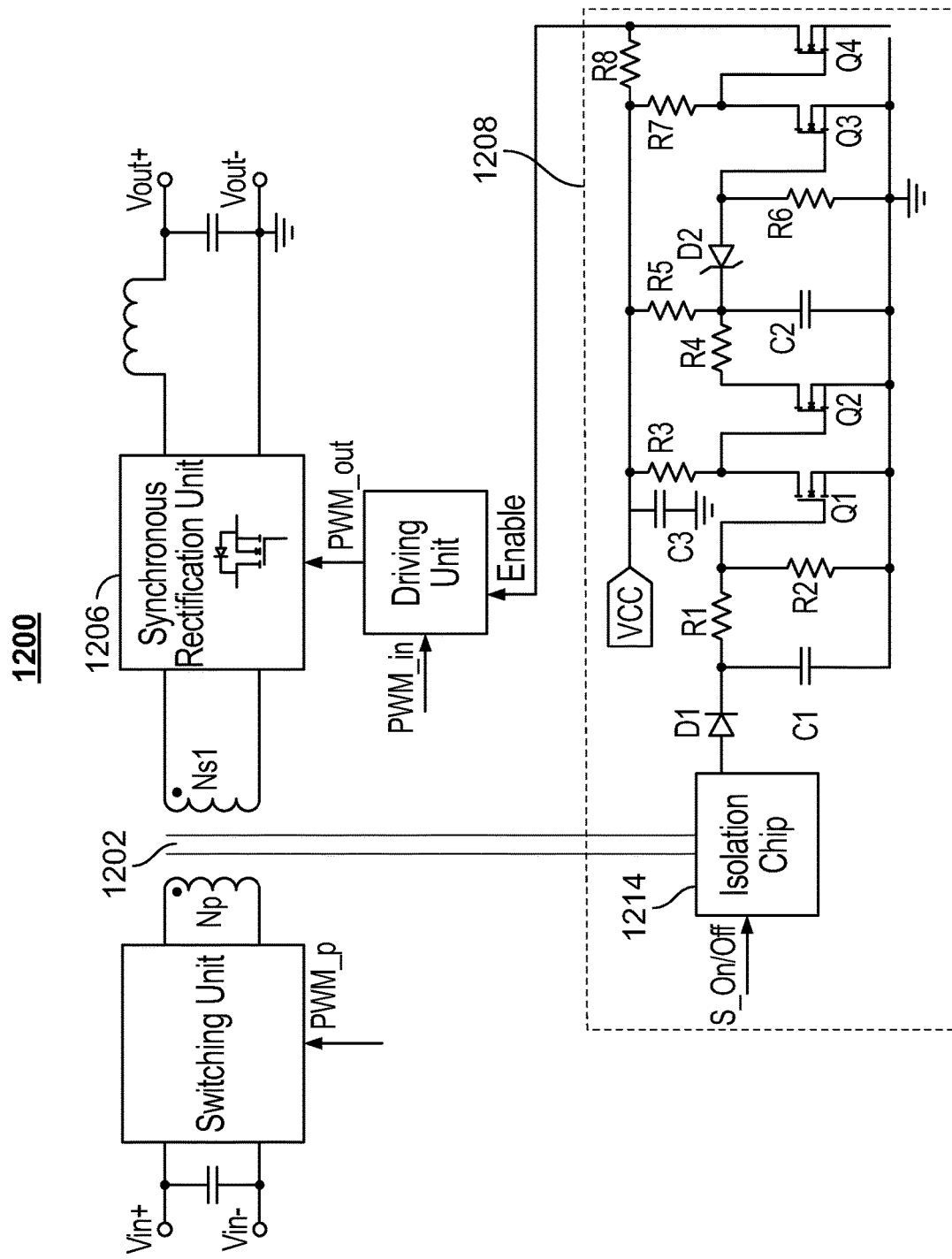
FIG. 12 is a circuit diagram of a DC-DC power converter where a pre-bias circuit includes an isolator coupled to receive a primary side converter on/off signal, according to a further example embodiment of the present disclosure.

FIG. 12 is a schematic circuit diagram illustrating a DC-DC converter 1200 according to a further example embodiment of the present disclosure. The DC-DC converter 1200 includes an isolation chip 1214 (e.g., an isolator), which may be part of or separate from the transformer 1202.

The pre-bias circuit 1208 includes the isolator 1214, a first diode D1 and a capacitor C1. The isolator 1214 is connected with an anode of the first diode D1, and a cathode of the diode D1 is connected with one end of the capacitor C1. A startup signal may include a power-on signal S_On/Off for the primary side. The signal S_On/Off may be supplied by the isolator 1214 from the primary side to the secondary side as the input signal. The pre-bias circuit 1208 may be coupled to generate, when the DC-DC converter 1200 is turned on, the input signal via the isolator 1214.

Figure 13:
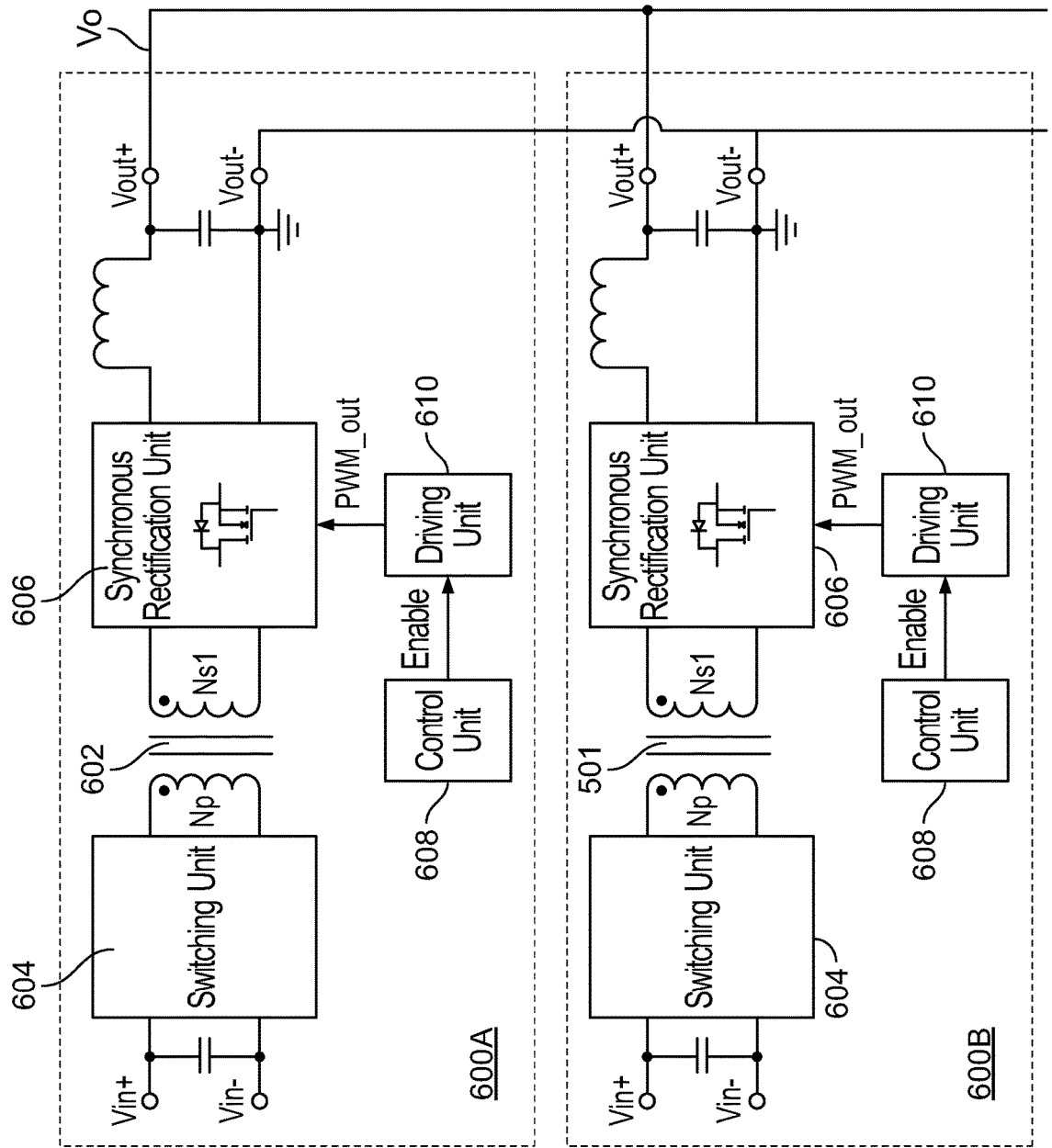
FIG. 13 is a circuit diagram of multiple DC-DC power converters of FIG. 6 coupled in parallel.

FIG. 13 is a schematic circuit diagram illustrating parallel startup of DC-DC converters 600A and 600B, according to another example embodiment of the present disclosure. Outputs of the converters 600A and 600B are connected in parallel, so the converters 600A and 600B share an output voltage Vo when both converters 600A and 600B are on.

At the time of power-on and startup of one of the converters 600A or 600B, the pre-bias circuit 608 operates the synchronous rectifier 606 in a body diode rectification state before the output voltage of the converter reaches a defined value Vo (e.g., before the defined time delay $t_1$ has elapsed in response to generation of the input signal at time t=0). Therefore, even if one of the converters 600A and 600B starts up and reaches Vo before the other converter due to different startup timings of the converters, the other converter will not be damaged due to recirculation. This allows for parallel startup of multiple DC-DC converters.

According to yet another example embodiment, a method of controlling a switch-mode DC-DC power converter is disclosed. The DC-DC power converter includes a transformer having at least one primary winding and at least one secondary winding, and a synchronous rectifier coupled to control current through the at least one secondary winding.

The method includes disabling switching of the synchronous rectifier for a defined time delay in response to receiving an input signal indicative of a startup of the DC-DC power converter, and enabling switching of the synchronous rectifier after the defined time delay has elapsed.

The method may include enabling switching operation of the synchronous rectifier for a defined turn-off time delay in response to the input signal transitioning to a logical low level, and disabling switching operating of the synchronous rectifier after the defined turn-off time delay has elapsed.

The DC-DC power converter may include a driver circuit coupled to control switching operation of the synchronous rectifier. Disabling switching operation of the synchronous rectifier may include disabling the driver circuit, and enabling switching operation of the synchronous rectifier may include enabling the synchronous rectifier.

The method may further include receiving, at the driver circuit, a pulse width modulated (PWM) control signal, and controlling switching operation of the synchronous rectifier according to the received PWM control signal when the driver circuit is enabled.

The DC-DC converter may include a pre-bias circuit including at least one resistor and at least one capacitor coupled in a resistor-capacitor (RC) circuit. The defined time delay and/or the defined turn-off time delay may correspond to an RC time constant of the RC circuit.

Receiving the input signal may include at least one of receiving the input signal via the at least one secondary winding of the transformer, receiving the input signal via an auxiliary winding of the transformer, and receiving the input signal via an isolator coupled between a primary side of the transformer and a secondary side of the transformer.

As described herein, the example power converters and control circuits may include a microprocessor, microcontroller, integrated circuit, digital signal processor, etc., which may include memory. The power converters and control circuits may be configured to perform (e.g., operable to perform, etc.) any of the example processes described herein using any suitable hardware and/or software implementation. For example, the power converters and controllers may execute computer-executable instructions stored in a memory, may include one or more logic gates, control circuitry, etc.

Example embodiments described herein may be used in any suitable power converter application, such as a DC-DC power converter, a converter including synchronous rectification, a converter experiencing a pre-bias output voltage at startup, a converter including multiple open loop converters connected in parallel, etc.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A switch-mode DC-DC power converter, comprising:
one or more input terminals for receiving an input voltage from a voltage source;
one or more output terminals for supplying an output voltage to a load;
a transformer coupled between the input and output terminals, the transformer including at least one primary winding and at least one secondary winding;
a primary switch coupled to control current through the at least one primary winding;
a synchronous rectifier coupled to control current through the at least one secondary winding; and
means for controlling switching operation of the synchronous rectifier by disabling switching of the synchronous rectifier for a defined time delay in response to receiving an input signal indicative of a startup of the DC-DC power converter from the at least one secondary winding, at least one auxiliary winding, or an isolator coupled between primary and secondary sides of the transformer, and enabling switching of the synchronous rectifier after the defined time delay has elapsed.

2. The DC-DC power converter of claim 1, wherein:
the at least one secondary winding of the transformer comprises at least two secondary windings;
the synchronous rectifier is coupled to control current through a first one of the at least two secondary windings; and
the means for controlling switching operation of the synchronous rectifier includes a pre-bias circuit coupled to receive the input signal from a second one of the at least two secondary windings.

3. The DC-DC power converter of claim 1, wherein the means for controlling switching operation of the synchronous rectifier includes a pre-bias circuit coupled to receive the input signal from the at least one secondary winding.

4. The DC-DC power converter of claim 1, wherein:
the transformer comprises the at least one auxiliary winding; and
the means for controlling switching operation of the synchronous rectifier includes a pre-bias circuit coupled to receive the input signal from the at least one auxiliary winding.

5. The DC-DC power converter of claim 1, further comprising the isolator coupled between the primary side of the transformer and the secondary side of the transformer, wherein:
the isolator is coupled to supply a drive signal for the primary switch from the primary side of the transformer to the secondary side of the transformer;
the means for controlling switching operation of the synchronous rectifier includes a pre-bias circuit coupled to receive the drive signal from the isolator; and
the input signal comprises the drive signal.

6. The DC-DC power converter of claim 1, further comprising the isolator coupled between the primary side of the transformer and the secondary side of the transformer, wherein:
the isolator is coupled to supply a converter turn-on signal from the primary side of the transformer to the secondary side of the transformer;
the means for controlling switching operation of the synchronous rectifier includes a pre-bias circuit coupled to receive the converter turn-on signal from the isolator; and
the input signal comprises the converter turn-on signal.

7. A method of controlling a switch-mode DC-DC power converter including a transformer including at least one primary winding and at least one secondary winding, a synchronous rectifier coupled to control current through the at least one secondary winding, and a driver circuit coupled to control switching operation of the synchronous rectifier, the method comprising:
in response to receiving an input signal indicative of a startup of the DC-DC power converter, disabling the driver circuit to disable switching of the synchronous rectifier for a defined time delay; and
enabling the driver circuit after the defined time delay has elapsed to enable switching of the synchronous rectifier.

8. The method of claim 7, further comprising:
enabling switching operation of the synchronous rectifier for a defined turn-off time delay in response to the input signal transitioning to a logical low level; and
disabling switching operating of the synchronous rectifier after the defined turn-off time delay has elapsed.

9. The method of claim 7, further comprising:
receiving, at the driver circuit, a pulse width modulated (PWM) control signal; and
controlling switching operation of the synchronous rectifier according to the received PWM control signal when the driver circuit is enabled.

10. The method of claim 7, wherein:
the DC-DC power converter includes a pre-bias circuit including at least one resistor and at least one capacitor coupled in a resistor-capacitor (RC) circuit; and
the defined time delay corresponds to an RC time constant of the RC circuit.

11. The method of claim 8, wherein:
the DC-DC power converter includes a pre-bias circuit including at least one resistor and at least one capacitor coupled in a resistor-capacitor (RC) circuit; and
the defined turn-off time delay corresponds to an RC time constant of the RC circuit.

12. The method of claim 7, wherein receiving the input signal includes at least one of:
receiving the input signal via the at least one secondary winding of the transformer;
receiving the input signal via an auxiliary winding of the transformer; and
receiving the input signal via an isolator coupled between a primary side of the transformer and a secondary side of the transformer.

13. The method of claim 7, wherein:
the DC-DC power converter includes a pre-bias circuit including at least one resistor and at least one capacitor coupled in a resistor-capacitor (RC) circuit, at least one switch and at least one diode coupled between the RC circuit and the switch;
receiving the input signal includes receiving the input signal at the pre-bias circuit; and
enabling and disabling the synchronous rectifier includes enabling and disabling via the at least one switch of the pre-bias circuit.

14. A switch-mode DC-DC power converter, comprising:
one or more input terminals for receiving an input voltage from a voltage source;
one or more output terminals for supplying an output voltage to a load;
a transformer coupled between the input and output terminals, the transformer including at least one primary winding and at least one secondary winding;
a primary switch coupled to control current through the at least one primary winding;
a synchronous rectifier coupled to control current through the at least one secondary winding; and
a control circuit coupled to receive an input signal indicative of active operation of the DC-DC converter from one of the windings of the transformer or an isolator coupled between primary and secondary sides of the transformer, and control switching operation of the synchronous rectifier by enabling switching operation of the synchronous rectifier for a defined time delay in response to the input signal transitioning to a logical low level and disabling switching operating of the synchronous rectifier after the defined time delay has elapsed.

15. The DC-DC power converter of claim 14, wherein the control circuit is coupled to, in response to receiving a startup signal indicative of a startup of the DC-DC power converter, disable switching of the synchronous rectifier for a defined turn-on time delay, and enable switching of the synchronous rectifier after the defined turn-on time delay has elapsed.

16. The DC-DC power converter of claim 14, wherein the control circuit includes:
a driver circuit coupled to receive a pulse width modulated (PWM) control signal to control switching operation of the synchronous rectifier according to the received PWM control signal; and
a pre-bias circuit coupled to receive the input signal and selectively enable and disable the driver circuit according to the received input signal and the defined time delay.

17. The DC-DC power converter of claim 16, wherein:
the pre-bias circuit includes at least one resistor and at least one capacitor coupled in a resistor-capacitor (RC) circuit; and
the defined time delay corresponds to an RC time constant of the RC circuit.

18. The DC-DC power converter of claim 15, wherein:
the pre-bias circuit includes at least one resistor and at least one capacitor coupled in a resistor-capacitor (RC) circuit; and
the defined turn-on time delay corresponds to an RC time constant of the RC circuit.

19. The DC-DC power converter of claim 14, wherein:
the at least one secondary winding of the transformer comprises at least two secondary windings;
the synchronous rectifier is coupled to control current through a first one of the at least two secondary windings; and
the control circuit includes a pre-bias circuit coupled to receive the input signal from a second one of the at least two secondary windings.

20. The DC-DC power converter of claim 14, wherein the control circuit includes a pre-bias circuit coupled to receive the input signal from the at least one secondary winding.

21. The DC-DC power converter of claim 14, wherein:
the transformer comprises at least one auxiliary winding; and
the control circuit includes a pre-bias circuit coupled to receive the input signal from the at least one auxiliary winding.

22. The DC-DC power converter of claim 14, further comprising an isolator coupled between a primary side of the transformer and a secondary side of the transformer, wherein:
the isolator is coupled to supply a drive signal for the primary switch from the primary side of the transformer to the secondary side of the transformer;
the control circuit includes a pre-bias circuit coupled to receive the drive signal from the isolator; and
the input signal comprises the drive signal.

23. The DC-DC power converter of claim 14, further comprising an isolator coupled between a primary side of the transformer and a secondary side of the transformer, wherein:
the isolator is coupled to supply a converter turn-on signal from the primary side of the transformer to the secondary side of the transformer;
the control circuit includes a pre-bias circuit coupled to receive the converter turn-on signal from the isolator; and the input signal comprises the converter turn-on signal.

24. The DC-DC power converter of claim 14, wherein:
the control circuit includes a pre-bias circuit including at least one resistor and at least one capacitor coupled in a resistor-capacitor (RC) circuit, at least one switch and at least one diode coupled between the RC circuit and the switch; and
the pre-bias circuit is coupled to receive the input signal and selectively enable and disable the synchronous rectifier according to the received input signal and the defined time delay.

25. A method of controlling a switch-mode DC-DC power converter including a transformer including at least one primary winding and at least one secondary winding, a synchronous rectifier coupled to control current through the at least one secondary winding, and a pre-bias circuit including at least one resistor and at least one capacitor coupled in a resistor-capacitor (RC) circuit, the method comprising:
in response to receiving an input signal indicative of a startup of the DC-DC power converter, disabling switching of the synchronous rectifier for a defined time delay, the defined time delay corresponding to an RC time constant of the RC circuit; and
enabling switching of the synchronous rectifier after the defined time delay has elapsed.

* * * * *